Dec. 26, 1961    M. L. VOLOSHIN    3,014,299
GLASS PENDANT ORNAMENTS
Filed Jan. 15, 1959

INVENTOR.
Milton L. Voloshin
BY Scott L. Norvel
Atty

United States Patent Office 3,014,299
Patented Dec. 26, 1961

3,014,299
GLASS PENDANT ORNAMENTS
Milton L. Voloshin, 1621 E. Brill St., Phoenix, Ariz.
Filed Jan. 15, 1959, Ser. No. 787,029
3 Claims. (Cl. 41—10)

This invention concerns glass pendant ornaments for Christmas trees or the like.

Heretofore, many types of ornaments of glass have been made by blowing glass tubes, and by denting and shaping the outer surfaces of the bulbs formed by the blowing process.

One of the objects of this invention is to provide an ornament of substantially uniform shape, which is made by a process which includes blowing and sucking on the glass forming tube to produce a series of expanded and contracted areas on the tube.

Another object of the invention concerns the process of heating, blowing and contracting a tube of hard glass such as borosilicate glass, to provide an ornament consisting of a series of bulged portions connected alternately by a series of collapsed bulged areas to form somewhat irregular but repeating shapes through the length of a pendant ornament.

Still another object consists of a process including the heating of a tube of hard glass until it attains a workable temperature; thence blowing an area to expand the tube; thence sucking on the blown portion to cause the walls to collapse, thereby making a fluted ornamental area, which is open on the interior, but which has constricted passageways leading from one bulged part to another.

Still another object includes the process of filling the bulged portions of the pendant ornament with clear, colored or opaque liquids to enhance the ornamental value of the pendant.

A still further object is to provide the formation of a pendant ornament of glass, which has a series of expanded cavities connected by a series of constricted tubular fins, and has a ring at the top of the uppermost cavity and a depending tip at the opposite end.

Other objects will appear hereinafter.

I attain the foregoing objects by means of the devices, parts and methods shown in the accompanying drawing, in which—

Similar numerals refer to similar parts in the several views.

Figures 6, 7:
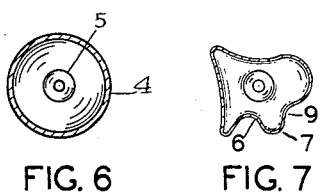
FIGURE 6 is a section taken on line 6—6 of FIGURE 2.
FIGURE 7 is a section of the device shown in FIGURE 3 with a section taken on line 7—7.

To make an ornament of the type herein concerned, the tube 2 is heated in a suitable flame until soft. Preferably borosilicate glass, which must be heated to about 820° C. to become soft enough to work, is used. The glass tube 2 is drawn out at each end and the end portions broken off at the necks 3 and 5, to attain the shape shown in FIGURE 2, wherein the central portion 4 of the tube 2 is maintained at its original size, and the outer end 5 and inner end 3 are drawn down to a smaller diameter and are somewhat tapered in shape. It is to be noted that, at this step, the central portion 4 of the tube 2 is maintained at its original size, and the outer end 5 and inner end 3 are drawn down to a smaller diameter and are somewhat tapered in shape. It is to be noted that, at this step, the central portion 4 is cylindrical in section, as shown in FIGURE 6.

The upper part A of the central portion 4 is then reheated and blown out to form a bulge indicated by dotted line 8. Immediately after the forming of the bulge 8, suction is applied to the inner end 3, and the bulge is caused to collapse and form the depressed areas 6, and leaving the ridges 7. The bottom portion B of the tube portion 4 is heated and is then blown out, sucked in and is twisted slightly, giving the ridges 7a on the lower part Ba, as shown on FIGURE 4. The longitudinally extending depressions 6a then extend from between the ridges 7a.

The above-stated process of heating, blowing, suction, drawing and twisting is then applied to any further lower portions of the original tube 2, if desired.

The upper neck 5 is then drawn out further and formed into an eye 15 and sealed.

Figures 1, 2, 3, 4, 5:
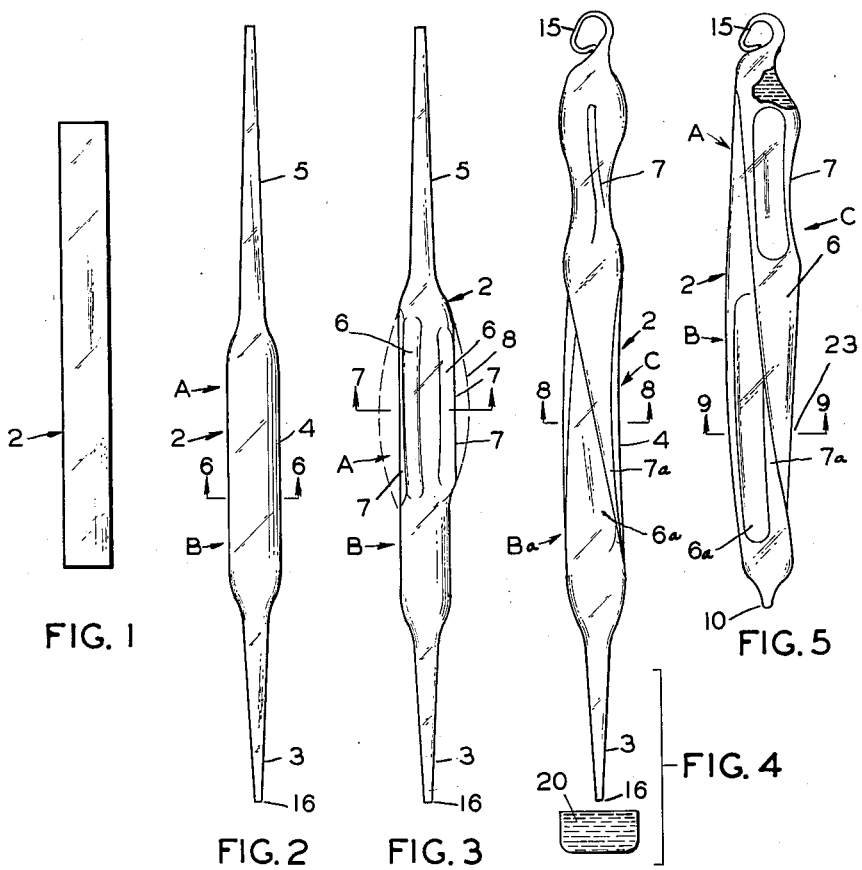
FIGURE 1 illustrates a length of tube which is to be blown, shaped and formed according to the process herein disclosed.
FIGURE 2 is the first step in the process of forming a pendant ornament as herein concerned.
FIGURE 3 is the second step in the process herein concerned, showing a formation of flutes and of webs by applying suction to the device after heating.
FIGURE 4 is a side elevation of the tube, after it has been fluted and twisted slightly, and the retaining eye at the top end formed.
FIGURE 5 is a side elevational view of a pendant after it has been filled with liquid and completed.
Figures 8, 9:
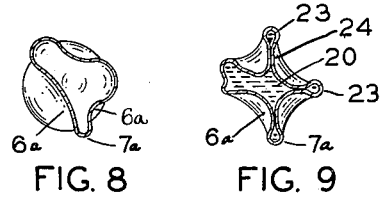
FIGURE 8 is a section of the device taken on line 8—8 of FIGURE 4.
FIGURE 9 is a section of the device taken on line 9—9 of FIGURE 5.

The tube now has an ornamental shape and has an elevational shape, as shown in FIGURE 5 and has a section as shown in FIGURE 8, and is marked "C."

Thereafter, and before the tube fully cools, the tip 16 of the inner neck 3 is immersed in a clear colored or opaque liquid 20. As the tube cools, the partial vacuum formed will draw the liquid into the tube, as indicated in FIGURES 5 and 9.

If the first heating does not completely fill the ornament "C," as now formed, the contained liquid may again be heated until vapor is produced while end 3 is held uppermost. The ornament "C" is then again inverted and tip 3 immersed in the liquid. The vapor cools and condenses and the liquid is again drawn into the ornament. Thereafter the tip of end 3 is sealed, as indicated at 10.

The liquid within the ornament "C" will reflect any lights close to the ornament, and enhance the attractiveness of the tube as a pendant.

As above made the ornament "C" consists of the eye 15 at the top. Below this is the bulged portion A that has the vertical ridges 7 between the depressed areas 6 forming flutes. Below this is a second bulged area B, having spiral ridges 7a and depressed areas 6a.

Below this any other bulged, fluted and twisted portions are added, if desired.

A seal is then formed at the lower end to hold the liquid added before sealing.

In this form "C" the device is an ornamental pendant.

Figure 10:
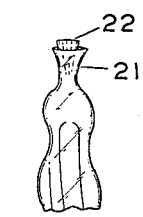
FIGURE 10 is a modified form of upper end structure of the device shown in FIGURE 5.

The upper end of the formed tube, as shown in FIGURE 5 may be expanded, rolled out and fire polished to form the vial neck 21 as shown in FIGURE 10. In this modified form the inner tip 3 is closed as above explained, and the formed tube used to hold liquids introduced through neck 21. An ornamental cork 22 may then be used to provide a completed vial.

The finished ornament consists of a hollow tubular body C which has an outer surface consisting of the somewhat bulbous areas at A and B which are superposed throughout the length of the ornament and which have an outer surface shaped to include longitudinal depressions interpositioned between radial longitudinal ridges. Some of these ridges are slightly spiral. The walls of tube 2 are expanded and thinned somewhat when the semi-spherical bulb 8 is formed. When this bulb is collapsed, to form the ridges 7 and 7a a rounded edge head 23 is formed and portions adjacent the head, as at 24, collapse and come in contact forming flanges. These are substantially radial relative to the tube body 2, and extend longitudinally, relative to the tube body, between the depressed areas 6 or 6a.

When the hollow interior of the ornament is filled with liquid, which may be colored or colorless, many light reflecting surfaces are provided and many lens-like areas are made available for the refraction of light striking the ornament. While the contours of the ornament are not always alike, there is a substantially uniform repetition of the general pattern to give the ornaments a uniform characteristic aspect and appearance.

I claim:

1. A pendant glass Christmas ornament comprising an elongated hollow body including at least one longitudinally extending, intermediate bulbous area, said bulbous area comprising a plurality of longitudinally extending helically conformed depression portions disposed between radially projecting and longitudinally extending webs terminating in longitudinally extending enlarged ribs at the outer edges thereof, said depressions, flanges and ribs merging at opposite ends into the surface of said hollow body, said hollow body being sealed at one end, the other end of said hollow body terminating in a hook portion permitting said ornament to be suspended.

2. The article of claim 1; including a liquid confined in said hollow body.

3. The article of claim 2; said liquid being colored.

References Cited in the file of this patent

UNITED STATES PATENTS

| | | |
|---|---|---|
| D. 183,809 | Roberts | Oct. 28, 1958 |
| 481,805 | McElroy | Aug. 30, 1892 |
| 1,561,808 | Towne | Nov. 17, 1925 |
| 2,042,905 | McCluskey | June 2, 1936 |
| 2,378,934 | Kloner | June 28, 1945 |
| 2,500,899 | Leahan | Mar. 14, 1950 |
| 2,512,781 | Stewart | July 27, 1950 |

OTHER REFERENCES

New Yorker, page 62, November 25, 1950.